United States Patent
Shulman

(10) Patent No.: US 10,015,637 B2
(45) Date of Patent: Jul. 3, 2018

(54) PRESENCE MONITORING

(71) Applicant: SKYLINE PROPERTY MEDIA LIMITED, London (GB)

(72) Inventor: Nicolas Shulman, London (GB)

(73) Assignee: Skyline Property Media Limited, London (GB)

( * ) Notice: Subject to any disclaimer, the term of this patent is extended or adjusted under 35 U.S.C. 154(b) by 0 days.

(21) Appl. No.: 15/118,151

(22) PCT Filed: Feb. 13, 2015

(86) PCT No.: PCT/GB2015/050412
§ 371 (c)(1),
(2) Date: Aug. 11, 2016

(87) PCT Pub. No.: WO2015/121669
PCT Pub. Date: Aug. 20, 2015

(65) Prior Publication Data
US 2017/0171717 A1    Jun. 15, 2017

(30) Foreign Application Priority Data

Feb. 13, 2014  (GB) .................................. 1402516.7

(51) Int. Cl.
*H04W 24/00* (2009.01)
*H04W 4/04* (2009.01)
*H04W 4/021* (2018.01)
*H04W 12/06* (2009.01)
(Continued)

(52) U.S. Cl.
CPC .......... *H04W 4/04* (2013.01); *G07C 9/00309* (2013.01); *G08B 21/22* (2013.01); *H04W 4/021* (2013.01); *H04W 12/06* (2013.01)

(58) Field of Classification Search
CPC ....... H04W 64/00; H04W 4/02; H04W 68/00; H04L 29/78657; H04M 1/72572
See application file for complete search history.

(56) References Cited

U.S. PATENT DOCUMENTS 6,225,906 B1    5/2001  Shore
2004/0004999 A1  1/2004  Koerner et al.
(Continued)

FOREIGN PATENT DOCUMENTS

GB          2505517 A       3/2014

*Primary Examiner* — Steve D Agosta
(74) *Attorney, Agent, or Firm* — Notaro, Michalos & Zaccaria P.C.

(57) ABSTRACT

A system for presence monitoring and in particular for presence monitoring in multiple presence buildings, so that emergency services can get an accurate presence list in the case of an emergency. A mobile device belonging to a user outputs a location notification to a location module when it crosses a geofence defining the boundaries of a facility. The location module monitors the location of one or more mobile devices belonging to users and outputs an indication whenever a location notification is received. A register module then operates in response to the location module to generate an up to date presence list for the facility based on the identity of monitored devices within the geofence. An interface outputs the presence list on demand and can transmit the presence list to one or more external devices or locations in response to an evacuation alarm.

32 Claims, 3 Drawing Sheets

(51) Int. Cl.
*G08B 21/22* (2006.01)
*G07C 9/00* (2006.01)

(56) References Cited

U.S. PATENT DOCUMENTS

| | | | |
|---|---|---|---|
| 2006/0003796 A1* | 1/2006 | Vireday | H04L 67/04 |
| | | | 455/550.1 |
| 2008/0067244 A1 | 3/2008 | Marks | |
| 2009/0006279 A1* | 1/2009 | Buettner | G06Q 10/10 |
| | | | 705/412 |
| 2009/0079569 A1 | 3/2009 | Salvat, Jr. | |
| 2011/0231019 A1* | 9/2011 | Nanami | G05B 19/042 |
| | | | 700/277 |
| 2011/0275388 A1* | 11/2011 | Haney | H04W 4/08 |
| | | | 455/456.3 |
| 2012/0078413 A1* | 3/2012 | Baker, Jr. | G07F 17/12 |
| | | | 700/232 |
| 2013/0045753 A1 | 2/2013 | Obermeyer et al. | |
| 2013/0314210 A1* | 11/2013 | Schoner | G06K 7/10366 |
| | | | 340/8.1 |

* cited by examiner

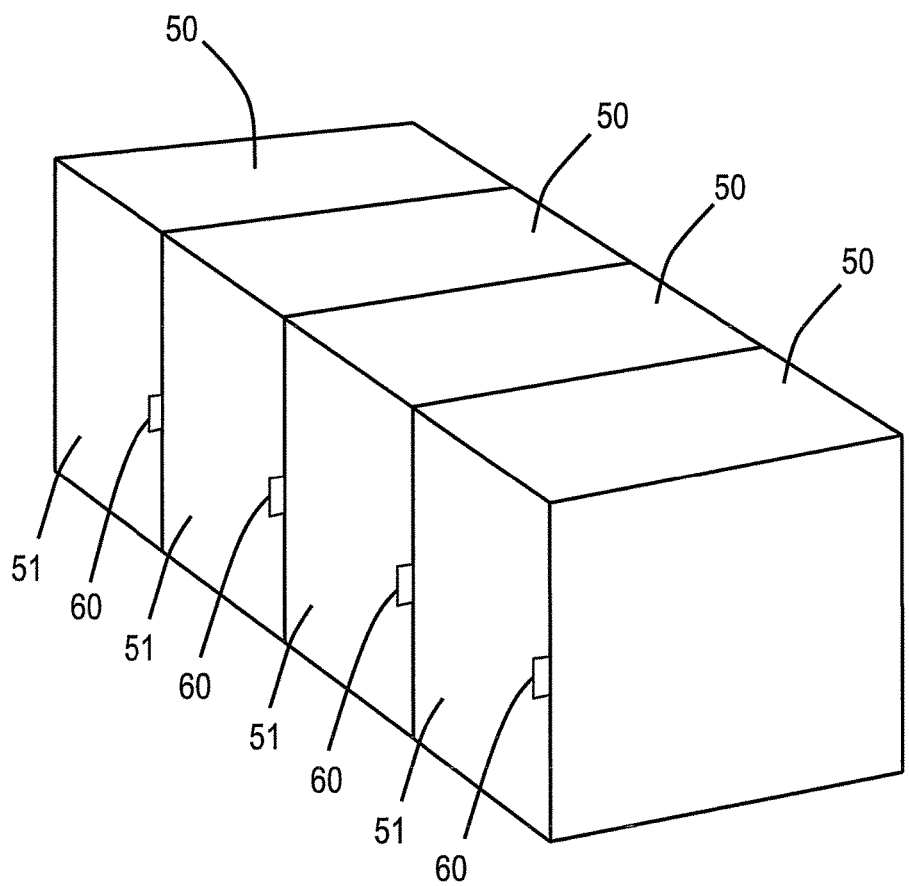
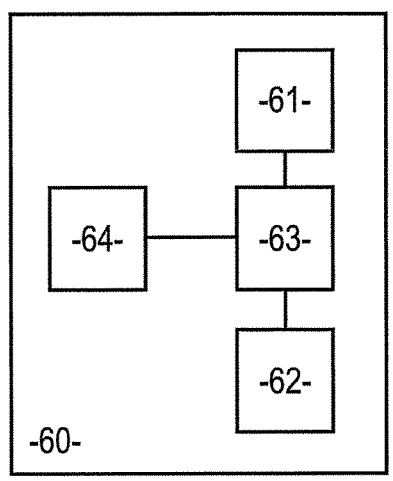
Fig. 3
Fig. 4

PRESENCE MONITORING

TECHNICAL FIELD OF THE INVENTION

The present invention relates to presence monitoring and in particular to presence monitoring systems suitable for monitoring multiple presence residential buildings.

BACKGROUND TO THE INVENTION

For many commercial facilities it is a requirement to monitor presence, particularly for the benefit of the emergency services in the event of fire or other emergency. Often this is achieved by "signing in" either physically in a visitor's book or by way of a dedicated key card or the like. Unlike commercial facilities, residents of multiple occupancy buildings are not usually asked to sign in on entry and there is no direct monitoring of presence. As a consequence, emergency services need to estimate presence based on plans of the building and/or other indirect information. Obviously, this can lead to considerable inaccuracy in presence estimates. Consequently emergency services personnel and/or residents of the building may face an unnecessarily increased risk of harm during an emergency.

It is therefore an object of the present invention to provide a system (and method) for presence monitoring that at least partially overcomes or alleviates the above problems.

SUMMARY OF THE INVENTION

According to a first aspect of the present invention there is provided a system for monitoring presence within a facility, the system comprising: a location module operable to monitor the location of one or more specified mobile devices and to output an indication whenever any of the monitored devices crosses a geofence defining the facility; and a register module operable in response to the location module to generate an up to date presence list for the facility based on the identity of monitored devices within the geofence; and an interface operable to output said presence list on demand and which can transmit the presence list to one or more external devices or locations in response to an evacuation alarm.

In this manner, by associating specific mobile devices with potential users of a facility and monitoring the location of said devices with respect to a geofence defining said facility, an up to date presence list can be generated on demand.

The location module may be operable to receive location notifications from individual mobile devices. In such cases, the mobile devices may be operable to determine location using a location unit incorporated in the mobile device. The location module may be connected to one or more transceiver devices, the transceiver devices operable to output a location indication when connected to a specified mobile device. The transceiver devices may comprise dedicated location beacons or multipurpose devices such as WiFi routers or the like. Such transceivers may be provided within the facility or at entrances/exits of the facility. Where one or more of the transceivers are multipurpose devices they may be transceivers provided or fitted by facility users and adapted to be connected to the location module. In such embodiments, the location module may be operable to additionally track unknown devices that are detected within the facility and hence infer the presence of one or more additional persons in the facility.

The location module may receive location notifications via a communication module. The communication module may be operable to communicate with specified mobile devices via one or more suitable wireless networks. In particular, the communication module may be operable to communicate with the mobile devices via a local WiFi network or via one or more cellular telephone or data networks.

The register module may be operable to look up the identity of specified mobile devices in a database. The database may provide an indication of the identity of one or more persons associated with said mobile device. The database may be updated with details of mobile devices and/or associated persons via the interface.

The components of the system may be located within the facility or may be provided at a remote location as required or as desired.

The register module may be operable to output the presence list to a building control module. The building control module may compare the presence list to imported data from existing building management or information systems, and generate a report based on this comparison. The interface module may then output said report on demand. Third party data may also be included in this report. In particular, the generated report may contain information on potential cost or energy savings.

The building control module may provide automated control of one or more building management or information systems in response to the presence list. A building management or information system may be a heating system, a lighting system, a water system, an air conditioning system, a lift system, a car park management system or a CCTV system.

The interface may output the presence list to a local terminal within the facility. In such a manner, the presence list may be viewed or printed for review by a building manager, receptionist, fire warden, concierge or the like. The interface may additionally or alternatively be operable to transmit or publish the presence list to one or more devices or remote locations. In this manner, the presence list can be viewed or reviewed by outside agencies such as the emergency services in the event that an emergency occurs at the facility.

A safe evacuation zone for the facility may be defined by a geofence. In such embodiments, the location module may be operable to receive notifications when devices cross the evacuation zone geofence and the register module may be operable to compare the facility presence list at the time of the alarm with the evacuation zone presence list. In this manner an up to date list of potentially missing occupants can be generated.

The facility may be a building (or set of buildings) of multiple presence. In particular, the building may be an apartment block or similar. In other embodiments, the building may be a hotel, hostel or similar. In still further embodiments, the building may be work space such as an office, factory or the like or a mixed workspace and leisure space such as a catering environment, retail environment, museum, gallery, entertainment environment or the like. In still further implementations, the facility may be a means of transport such as a bus, coach, train, airplane, ship or the like.

The mobile devices may be smartphones, tablet computers or the like associated with regular occupants or visitors to the facility. Where an occupant or visitor is associated with multiple mobile devices, one of said devices may be nominated as a primary device for location purposes. In particular, the smartphone may be provided with a location unit. Preferably, the mobile device is operable to monitor the device location with respect to the geofence and transmit location notifications to the location module when the device crosses a geofence defining the facility. The location unit may be adapted to provide this functionality by a downloadable application.

The system may further comprise an authentication module. The authentication module may be operable to authenticate devices determined to be within the facility to access one or more additional devices or services. The additional devices or services may be specific devices or services provided to regular occupants of the facility. In particular, the services may be related to facility management such as the issue of maintenance notifications, upload or maintenance requests, the payment or calculation of rent or other charges, the booking of additional services, the activation/deactivation of locks or alarms, the acquisition of copy documents or transfer documents or similar.

In a preferred embodiment, particular lock and/or alarms may be operable in response to the authentication module. In this manner, the system of present invention may be used to enable access to specified areas or locations within the facility for authenticated users. Such areas or locations may include private or communal occupant areas or utilities such as individual or communal storage spaces, individual or communal work or living spaces or the like. In particular, the facilities may include individual secure storage areas where external providers may deliver items for later collection by facility users. The secure storage areas may be adapted to maintain specified temperature conditions where perishable items are delivered or may be adapted to have dedicated hanging formations for storing clothing or the like.

In a preferred implementation, the locks/alarms in such embodiments comprise a communication unit operable to communicate with the authentication module. The locks or alarms may further comprise a controller unit operable in response to the communication unit to control the activation/deactivation of the lock or alarm.

In some embodiments, the lock or alarm may require a key for activation or deactivation. The key may be required in addition to or in place of the communication with the activation module. Preferably, in such embodiments, the lock or alarm may also comprise a key input means operable to receive a key for activation/deactivation of the lock or alarm. The key input means may be connected to the controller unit. The key may comprise: a code; or a physical device such a mechanical key, an RF tag, magnetic strip, secure integrated circuit, optical pattern or the like. Where the key is a code, the code may be received via the communication means or may be input via a user interface provided as a key input means. Where the key is a physical item, the key input means may comprise a corresponding mechanism or key reader.

According to a second aspect of the present invention there is provided a mobile device adapted to provide location notifications to an presence monitoring system according to the present invention, said device comprising a location unit operable to monitor the device location with respect to the geofence and output an indication thereof and a communication unit operable to transmit location notifications to an external location module when the mobile device crosses a geofence defining the facility.

The mobile device of the second aspect of the present invention may incorporate any or all features of the system of the first aspect of the present invention as desired or as appropriate.

According to a third aspect of the present invention there is provided a method of monitoring the presence of a facility comprising the steps of: associating specified mobile devices with potential occupants of the facility; determining whether said specified mobile devices are located within a geofence defining said facility and generating an up to date presence list for the facility based on the identity of monitored devices within the geofence.

The method of the third aspect of the present invention may incorporate any or all features of the system and device of the first two aspects of the present invention, as desired or as appropriate.

According to a fourth aspect of the present invention there is provided a method of enabling activation or deactivation of a lock or alarm, the method comprising the steps of: associating specified mobile devices with potential users of a facility; determining whether said specified mobile devices are located within a geofence defining said facility; and communicating an activation/deactivation signal to said lock or alarm.

The method of the fourth aspect of the present invention may incorporate any or all features of the system, device and method of the first three aspects of the present invention, as desired or as appropriate.

According to a fifth aspect of the present invention there is provided a lock or alarm for use in the method of the fourth aspect of the present invention, the lock or alarm comprising: a communication unit for communicating with an external authentication module; and a controller unit operable in response to the authentication module to activate or deactivate the lock or alarm.

The lock or alarm of the fifth aspect of the present invention may incorporate any or all features of the previous aspects of the present invention, as desired or as appropriate.

According to a sixth aspect of the present invention there is provided a storage unit whereby access to the storage unit is controlled by a lock or alarm according to the fifth aspect of the present invention.

The storage unit of the sixth aspect of the present invention may incorporate any or all features of the previous aspects of the present invention, as desired or as appropriate.

DETAILED DESCRIPTION OF THE INVENTION

In order that the invention may be more clearly understood an embodiment/embodiments thereof will now be described, by way of example only, with reference to the accompanying drawings, of which:

FIG. 3 is a schematic illustration of a secure storage unit according to the present invention; and FIG. 4 is a schematic illustration of a lock of a secure storage unit according to the present invention.

Figure 1:
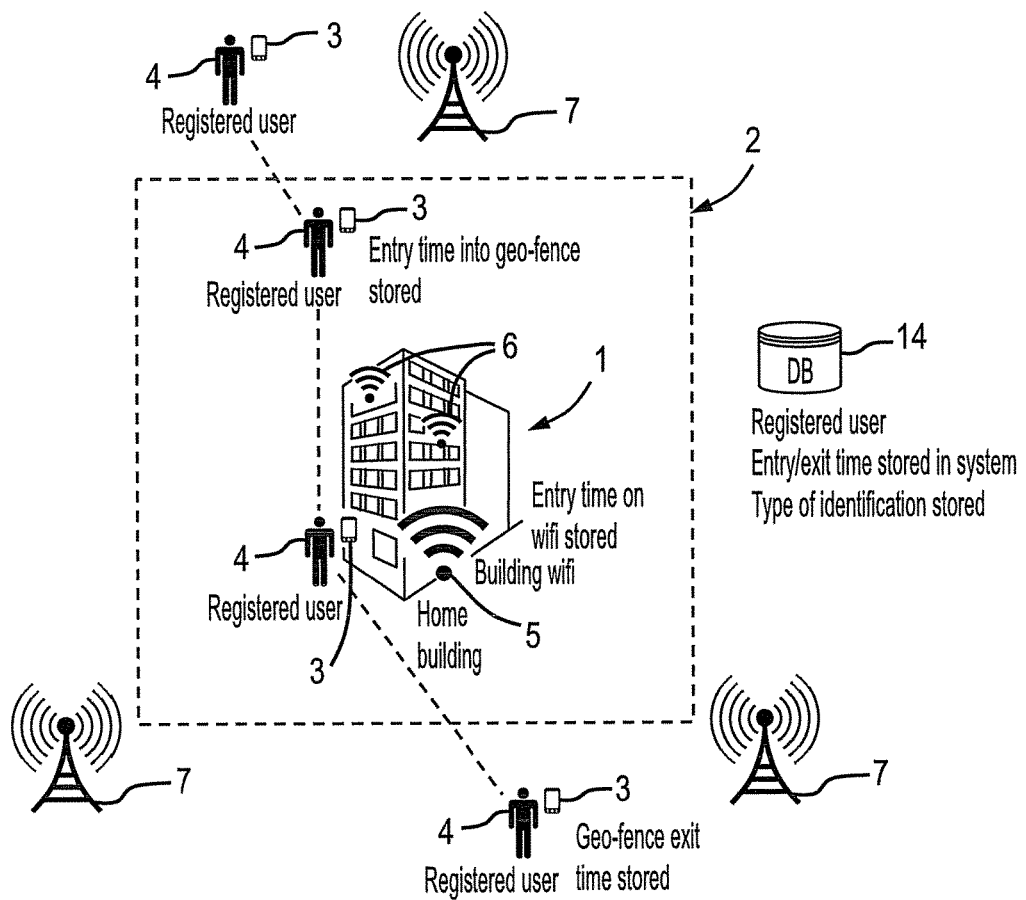
FIG. 1 is a schematic illustration of an apartment building provided with a geofence according to the present invention.
Figure 2:
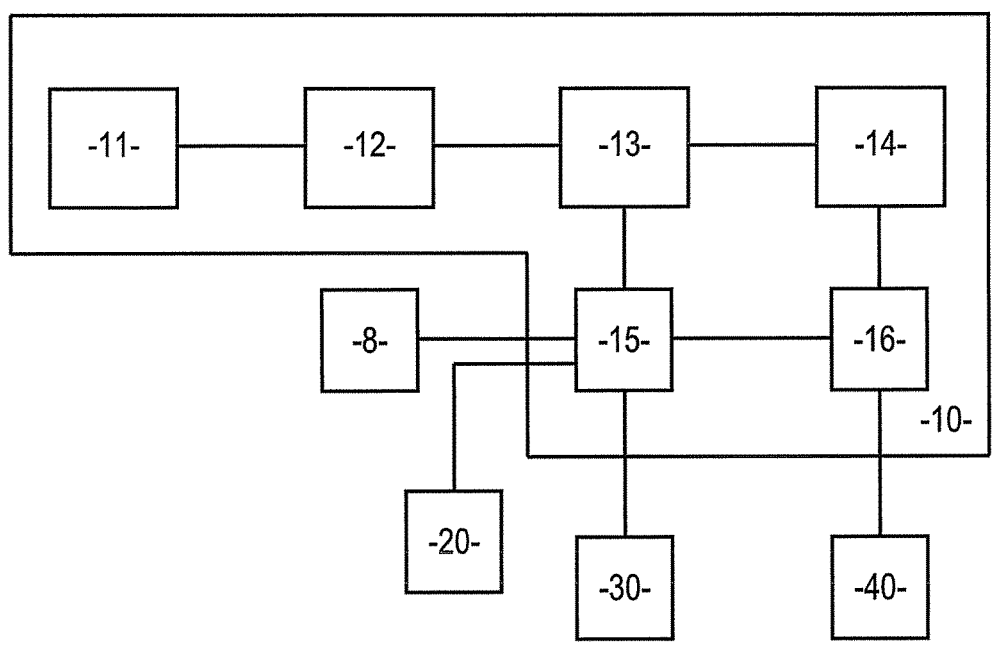
FIG. 2 is a schematic block diagram of an presence monitoring system according to the present invention.

Turning now to FIG. 1, a facility in the form of a block of apartments 1 is shown. The boundaries of the block of apartments 1 are defined by a geofence 2. When a mobile device 3 (typically a smartphone, tablet computer or the like) of a registered user 4 (typically a resident of the building 1) crosses the geofence 2, the mobile device 3 provides a location notification to an presence monitoring system 10 in order that the system 10 can generate an up to date presence list for the facility based on the identity of monitored devices 3 within the geofence 2. The up to date list can be used for the purpose of ensuring full evacuation of the building 1 is achieved in an emergency and/or for authentication when allowing registered users 4 to access particular services.

The system 10 comprises a communications unit 11, a location module 12, a register module 13, a database 14, an interface 15 and authentication module 16. The communication module 11 is operable to enable communication with the registered mobile devices 3 via any suitable network. The communication module 11 may additionally be operable to communicate with one or more other devices. Typically these might include a main building WiFi router 5, individual apartment WiFi routers 6, cellular network base stations 7 or other wireless beacons (not shown). If the communication module is operable to communicate with one or more wireless beacons, said beacon may act as a local web server, storing information such as building drawings or manuals for plant or machinery which can then be provided on request to authorised parties such as the fire service or maintenance engineers attending the block of apartments 1.

The location module 12 is operable to receive via the communication module 11 location notifications from the registered mobile devices 3 whenever such a device crosses the geofence 2. In some embodiments, the location module 12 may also receive, via the communication module 11, location notifications from Wifi routers 5, 6, base stations 7 or other beacons location notifications to the effect that they have detected a registered mobile device 3 and hence that the device 3 is within the geofence 2.

The register module 13 is operable in response to indications output by the location module 12 to determine which registered devices 3 are presently within the geofence 2. By looking up the database 14, the register module 13 can thereby determine which registered users 4 are within the geofence 2 and hence generate an up to date estimated presence list.

The register module 13 can output the estimated presence list to a building management module, which can then compare said estimated presence list against imported data from existing building management or information systems, and generate a report on this comparison. The report can be output to interface 15 where it can be accessed by authorised parties. The generated report can, in particular, provide information on potential cost or energy savings to a building manager.

In addition, third party data can be included within the report. This third party data could take the form of weather reports for the area in which the facility is situated.

The building control module can automatically control any number of building management or information systems. The building management or information systems can take the form of heating, lighting, water, air conditioning, lifts, car park management or cctv systems.

In particular, the heating and or lighting can be activated or deactivated in response to the presence or absence of persons within the building as a whole or within specific areas of the building. In the example of car park management, car park spaces for registered users determined not to be present in the building can be reallocated or rented to newcomers.

The estimated presence list can be output to interface 15 where it can be accessed by authorised parties. In particular, it may be accessed via a local terminal 8 within the building for use by the building manager, receptionist, fire warden or concierge. This can allow the presence of the building to be monitored for routine maintenance or security purposes. In particular, selected maintenance or repair notifications may be only issued to users 4 on the presence list rather than to all registered users.

In addition, the presence list may be used by the building manager or concierge as a check list in the event of evacuation. Such evacuations would typically be in response to an evacuation alarm such as a fire alarm, fire drill or similar. In some embodiments, a safe evacuation zone of the building 1 may be defined by a separate geofence monitored by the system 10. In these embodiments, the register unit 13 may be operable to compare an up to date presence list for the building 1 at the time of the alarm to an presence list for the evacuation zone so as to generate an up to date list of potentially missing persons. Checking the evacuation zone for the presence of these persons (who may have left mobile devices behind in their evacuation) can help eliminate doubt as to whether a safe evacuation has been completed.

The interface 15 may also be operable to store copies of the list in a remote archive 20, typically for auditing purposes or to automatically despatch either a copy of the list or at least information as to the current estimated presence to the emergency services 30 in the event of an emergency or evacuation event.

The register module 13 may also be connected to an authentication module 16. The authentication module 16 can provide a list of authenticated registered mobile devices 3 (or registered user 4) for use by a building services gateway 40. This can ensure that particular services are only accessed by registered users 4 when they are in the building. Such services may include maintenance requests, the payment or calculation of rent or other charges, the booking of additional services (e.g. concierge services), the acquisition of copy documents or transfer documents related to ownership or rental of an apartment or similar.

A further possible use of the authentication module is to authenticate access to specified areas within the building. These specified areas may be individual apartments (or rooms within apartments); individual storage areas; communal areas, such as garages, lofts or cellars, laundry/drying facilities.

This use is illustrated by reference to a secure storage unit 50. The secure storage unit 50 might be used simply to store items by a resident of the building. More typically, the storage unit 50 may one of several used to receive items delivered by external suppliers whilst the resident is absent, as is illustrated in FIG. 3. These items might include parcels, food/drink, laundry or the like. Where necessary the storage unit 50 may be temperature controlled. Each storage unit 50 is provided with a door 51 secured by a lock.

Turing now to FIG. 4, the lock 60 may comprise: a communication unit 61 operable to communicate with the authentication module 16; a key entry means 62 operable to receive a key; a controller unit 63 operable in response to the communication unit 61 and/or the key entry means 62 to control the operation of a lock mechanism 64 to activate or deactivate the lock. The key may be a mechanical key, a physical device or a code and the key entry means 62 corresponds to the particular form of key. For instance, if the key is a code, the key entry means 62 may comprise a user interface for key entry or if the key is on a smart card, the key entry means 62 may comprise a smart card reader.

In typical use, a resident may gain access to the secure storage unit 50 by means of a specified key and an authentication signal sent from the authentication module 16 to the communication unit 61 authenticating that their registered mobile device 3 is present. Where the storage unit 50 is used for deliveries, the delivery person may be supplied with the location of the storage unit 50, a registered mobile device 3 and a key. By means of these, the delivery person may access the storage unit 50 on arrival to store the delivered items. Subsequently, the resident may access the storage unit 50 at a convenient time to retrieve the items. In a preferred embodiment, the key may comprise time limited codes despatched to the registered mobile devices 3 of the delivery person and resident. This can ensure security is maintained if the storage unit 50 is to be used for multiple deliveries and may also provide an audit trail in the case of problems with a delivery.

Whilst the above example is described in relation to a secure storage unit 50 in a residential building, the invention may equally be applied to a secure storage unit 50 in any other location where a presence monitoring system 10 is provided.

The above embodiments are described by way of example only. Many variations are possible without departing from the scope of the invention as defined in the appended claims.

The invention claimed is:

1. A system for monitoring presence within a facility, the system comprising: a location module operable to monitor the location of one or more specified mobile devices and to output an indication whenever any of the monitored devices crosses a geofence defining the facility; and a register module operable in response to the location module to generate an up to date presence list for the facility based on the identity of monitored devices within the geofence; an interface operable to output said presence list on demand and which can transmit the presence list to one or more external devices or locations in response to an evacuation alarm; and an authentication module operable to authenticate devices determined to be within the facility to access one or more additional devices or services, wherein the location module is connected to one or more transceiver devices, the transceiver devices operable to output a location indication when connected to a specified mobile device, the location module is operable to additionally track unknown devices that are detected within the facility and hence infer the presence of one or more additional persons in the facility, the register module outputs the presence list to a building control module, which compares the presence list to imported data from existing building management or information systems and generates a report on this comparison, the building control module provides automated control of one or more building management or information systems in response to the presence list, a building management or information system is any one or a combination of: a heating system; a lighting system; a water system; an air conditioning system; a lift system; or a CCTV system, particular locks and/or alarms are activated or deactivated in response to the authentication module and the locks and/or alarms enable access to specified areas or locations within the facility for authenticated users.

2. A system as claimed in claim 1 wherein the location module is operable to receive location notifications from individual mobile devices operable to determine location using a location unit incorporated in the mobile device.

3. A system as claimed in claim 1 wherein the location module receives location notifications via a communication module.

4. A system as claimed in claim 1 wherein the register module is operable to look up the identity of specified mobile devices in a database providing an indication of the identity of one or more persons associated with said mobile device.

5. A system as claimed in claim 4 wherein the database is updated with details of mobile devices and/or associated persons via the interface.

6. A system as claimed by claim 1 wherein the report is output on demand by the interface module.

7. A system as claimed in claim 1 wherein the report contains information on potential cost or energy savings.

8. A system as claimed in claim 1 wherein the interface outputs the presence list to a local terminal within the facility.

9. A system as claimed in claim 1 wherein the interface is operable to transmit or publish the presence list to one or more other devices or locations.

10. A system as claimed in claim 1 wherein a safe evacuation zone for the facility is defined by a geofence.

11. A system as claimed in claim 10 wherein the location module is operable to receive notifications when devices cross the evacuation zone geofence and to compare the facility presence list at the time of the alarm with the evacuation zone presence list.

12. A system as claimed in claim 1 wherein the facility is any one of: a building (or set of buildings) of multiple presence; an apartment block; a hotel or hostel; an office or factory; a mixed workspace and leisure space such as a catering environment, retail environment, museum, gallery or entertainment environment; or a means of transport such as a bus, coach, train, airplane or ship.

13. A system as claimed in claim 1 wherein the mobile devices are smartphones or tablet computers associated with regular occupants or visitors to the facility.

14. A system as claimed in claim 1 wherein the locks/alarms comprise a communication unit operable to communicate with the authentication module; a controller unit operable in response to the communication unit to control the activation/deactivation of the lock or alarm.

15. A system as claimed in claim 14 wherein the lock or alarm additionally comprises a key input means operable to receive a key for activation/deactivation of the lock or alarm, the key input means being connected to the controller unit.

16. A system as claimed in claim 1, comprising at least one mobile device adapted to provide location notifications, said device comprising a location unit operable to monitor the device location with respect to the geofence and output an indication thereof and a communication unit operable to transmit location notifications to an external location module when the mobile device crosses a geofence defining the facility.

17. A system as claimed in claim 16 wherein the mobile device is a smartphone or tablet computer associated with regular occupants or visitors to the facility.

18. A system as claimed in claim 16 wherein the location unit is adapted to transmit location notifications to the location module by a downloadable application.

19. A method for monitoring presence within a facility, the system comprising:
  a location module operable to monitor the location of one or more specified mobile devices and to output an indication whenever any of the monitored devices crosses a geofence defining the facility; and
  a register module operable in response to the location module to generate an up to date presence list for the facility based on the identity of monitored devices within the geofence;
  an interface operable to output said presence list on demand and which can transmit the presence list to one or more external devices or locations in response to an evacuation alarm; and an authentication module operable to authenticate devices determined to be within the facility to access one or more additional devices or services, wherein the location module is connected to one or more transceiver devices, the transceiver devices operable to output a location indication when connected to a specified mobile device, the location module is operable to additionally track unknown devices that are detected within the facility and hence infer the presence of one or more additional persons in the facility, the register module outputs the presence list to a building control module, which compares the presence list to imported data from existing building management or information systems and generates a report on this comparison, the building control module provides automated control of one or more building management or information systems in response to the presence list, a building management or information system is any one or a combination of:

a heating system; a lighting system; a water system; an air conditioning system; a lift system; or a CCTV system, particular locks and/or alarms are activated or deactivated in response to the authentication module and the locks and/or alarms enable access to specified areas or locations within the facility for authenticated users.

20. A method as claimed in claim 19 including the step of outputting the presence list for review by a building manager, receptionist, concierge or the like.

21. A method as claimed in claim 19 including transmitting or publishing the presence list to one or more devices or remote locations for review by outside agencies.

22. A method as claimed in claim 19 including defining a safe evacuation zone for the facility by a geofence, receiving notifications when devices cross the evacuation zone geofence; comparing the facility presence list at the time of an evacuation alarm with the evacuation zone presence list to generate an up to date list of potentially missing occupants.

23. A method as claimed in claim 19 wherein the facility is any one of: a building (or set of buildings) of multiple presence; an apartment block; a hotel or hostel; an office or factory; a mixed workspace and leisure space such as a catering environment, retail environment, museum, gallery or entertainment environment; or a means of transport such as a bus, coach, train, airplane or ship.

24. A method as claimed in claim 19 wherein the mobile device is a smartphone associated with regular occupants or visitors to the facility.

25. A method as claimed in claim 19 comprising the step of communicating an activation/deactivation signal to a lock or alarm.

26. A method as claimed in claim 25 wherein the step of determining whether said specified mobile devices are located within a geofence defining said facility is carried out by a system and the authentication signal is communicated by the authentication module.

27. A method as claimed in claim 26 wherein the lock or alarm requires a key for activation or deactivation in addition to or in place of the communication with the activation module.

28. A lock or alarm suitable for use in the method of claim 25, the lock or alarm comprising: a communication unit for communicating with an external authentication module; and a controller unit operable in response to the authentication module to activate or deactivate the lock or alarm.

29. A lock or alarm as claimed in claim 28 wherein the lock additionally comprises a key input means operable to receive a key for activation/deactivation of the lock or alarm, the key input means being connected to the controller unit.

30. A lock or alarm as claimed in claim 29 wherein the key comprises: a code; and the code is received via the communication means or is input via a user interface provided as the key input means.

31. A lock or alarm as claimed in claim 29 wherein the key comprises a physical device and the key input means comprises a corresponding mechanism or key reader.

32. A storage unit whereby access to the storage unit is controlled by a lock or alarm according to claim 28.

* * * * *